United States Patent
Lee et al.

(10) Patent No.: US 7,522,547 B2
(45) Date of Patent: Apr. 21, 2009

(54) METHOD FOR TRANSMITTING FATIM IN MOBILE AD HOC NETWORK AND MEDIUM ACCESS CONTROL PROTOCOL LAYER MODULE THEREFOR

(75) Inventors: Soon-Jung Lee, Suwon-si (KR); Joong-Soo Ma, Daejeon (KR); Myung-Hwan Seo, Daejeon (KR)

(73) Assignee: Samsung Electronics Co., Ltd (KR)

( * ) Notice: Subject to any disclaimer, the term of this patent is extended or adjusted under 35 U.S.C. 154(b) by 888 days.

(21) Appl. No.: 10/899,399

(22) Filed: Jul. 26, 2004

(65) Prior Publication Data

US 2005/0190767 A1    Sep. 1, 2005

(30) Foreign Application Priority Data

Feb. 27, 2004  (KR) .................. 10-2004-0013595

(51) Int. Cl.
*H04H 20/71* (2008.01)
*G08C 17/00* (2006.01)
*G08C 15/00* (2006.01)

(52) U.S. Cl. .................. 370/312; 370/311; 370/252
(58) Field of Classification Search .................. None
See application file for complete search history.

(56) References Cited

U.S. PATENT DOCUMENTS

| | | | | |
|---|---|---|---|---|
| 6,192,230 | B1* | 2/2001 | van Bokhorst et al. ... | 455/343.3 |
| 6,788,670 | B1* | 9/2004 | Larsson ................ | 370/351 |
| 7,167,732 | B2* | 1/2007 | Choi et al. ............ | 455/574 |
| 2002/0036989 | A1* | 3/2002 | Payton ................. | 370/254 |
| 2002/0131484 | A1* | 9/2002 | Diepstraten et al. .... | 375/222 |
| 2003/0081603 | A1* | 5/2003 | Rune .................. | 370/390 |
| 2004/0105401 | A1* | 6/2004 | Lee ................... | 370/311 |
| 2005/0047357 | A1* | 3/2005 | Benveniste ............ | 370/311 |
| 2005/0063348 | A1* | 3/2005 | Donovan ............... | 370/338 |
| 2005/0117530 | A1* | 6/2005 | Abraham et al. ........ | 370/310 |
| 2005/0169292 | A1* | 8/2005 | Young ................. | 370/432 |
| 2005/0201340 | A1* | 9/2005 | Wang et al. ........... | 370/337 |
| 2006/0149980 | A1* | 7/2006 | Zhong ................. | 713/320 |
| 2006/0165024 | A1* | 7/2006 | Iwami et al. .......... | 370/315 |
| 2008/0049619 | A1* | 2/2008 | Twiss ................. | 370/236 |

\* cited by examiner

*Primary Examiner*—Chi H Pham
*Assistant Examiner*—Warner Wong
(74) *Attorney, Agent, or Firm*—The Farrell Law Firm, PC (57) ABSTRACT

A method for transmitting a flooding ad hoc traffic indication message (FATIM) in a power save mode whose beacon interval is divided into an ad hoc traffic indication message (ATIM) window and data transmission window subsequent to the ATIM window, in a mobile ad hoc network (MANET) constituted by a plurality of nodes. When one of the plurality of nodes has data to be forwarded to different nodes, a FATIM frame indicating that a network broadcast message will be sent to its neighbor nodes is forwarded during the ATIM window. If a current ATIM window has not expired, at least one different node of the plurality of nodes receiving the FATIM frame forwards the received FATIM frame to its neighbor nodes.

10 Claims, 9 Drawing Sheets

METHOD FOR TRANSMITTING FATIM IN MOBILE AD HOC NETWORK AND MEDIUM ACCESS CONTROL PROTOCOL LAYER MODULE THEREFOR

PRIORITY

This application claims priority to an application entitled "METHOD FOR TRANSMITTING FATIM IN MOBILE AD HOC NETWORK AND MEDIUM ACCESS CONTROL PROTOCOL LAYER MODULE", filed in the Korean Intellectual Property Office on Feb. 27, 2004 and assigned Serial No. 2004-13595, the contents of which are hereby incorporated by reference.

BACKGROUND OF THE INVENTION

1. Field of the Invention

The present invention relates generally to a mobile ad hoc network (MANET), i.e., a network using a plurality of mobile terminals/stations, and more particularly to a medium access control (MAC) protocol layer module for wireless local area networks (LANs) based on the Institute of Electrical and Electronics Engineers (IEEE) 802.11 standard and a method for transmitting a flooding ad hoc traffic indication message (FATIM).

2. Description of the Related Art

A mobile ad hoc network (MANET) is an infrastructure network implemented without a fixed router or host and a base station. In the MANET, a connection between mobile nodes is made using multi-hopping technologies based on a peer-to-peer level. Topology of the MANET can be dynamically changed, and the MANET can carry out a self-forming function and a self-healing function. Because the MANET is not a network in which only a fixed based station supports a mobile service, nodes enable a network routing infrastructure architecture in an ad hoc form. No limitation is present when the respective nodes included in the MANET can freely move, and therefore, the MANET uses a protocol adaptable to a structural variation according to fast movement of a node.

A medium access control (MAC) protocol supporting the MANET for wireless local area networks (LANs) based on the Institute of Electrical and Electronics Engineers (IEEE) 802.11 standard is based on a distributed coordination function (DCF), and specifies a power save mode (PSM) for a power saving mechanism. Each node in the MANET has basic computing and wireless communicating capabilities and usually limited capacity of battery power supply. In MANET research, energy efficient techniques have been very important issues from all aspects of system and protocol design.

The DCF specifies the PSM consisting of 3 states of power consumption. The 3 states include an off state, an awake state, and a sleep state. In the off state, a wireless interface consumes no power. In the awake state, the wireless interface consumes a necessary level of power required for a transmission operation, a reception operation, or a listening operation (idle mode). However, very little power is consumed in the sleep state in which the wireless interface cannot carry out the transmission or reception operation. In the DCF, time is divided into fixed intervals, that is, beacon intervals, and each beacon interval is divided into an ad hoc traffic indication message (ATIM) window and a following data transmission window. During the ATIM window, each node wakes up and exchanges the announcements for next data transmission with neighbors. The nodes sending or receiving ATIMs stay awake for data transmission and other nodes go into the sleep state. The data packets usually move forward, hop by hop, consuming one beacon interval per hop.

As described above, nodes operating in the DCF PSM are in either the awake state or the sleep state. The nodes in the awake state can transmit or receive packets and consume different amounts of energy according to operating states. The nodes in the sleep state cannot communicate but consume very little energy.

Figure 1:
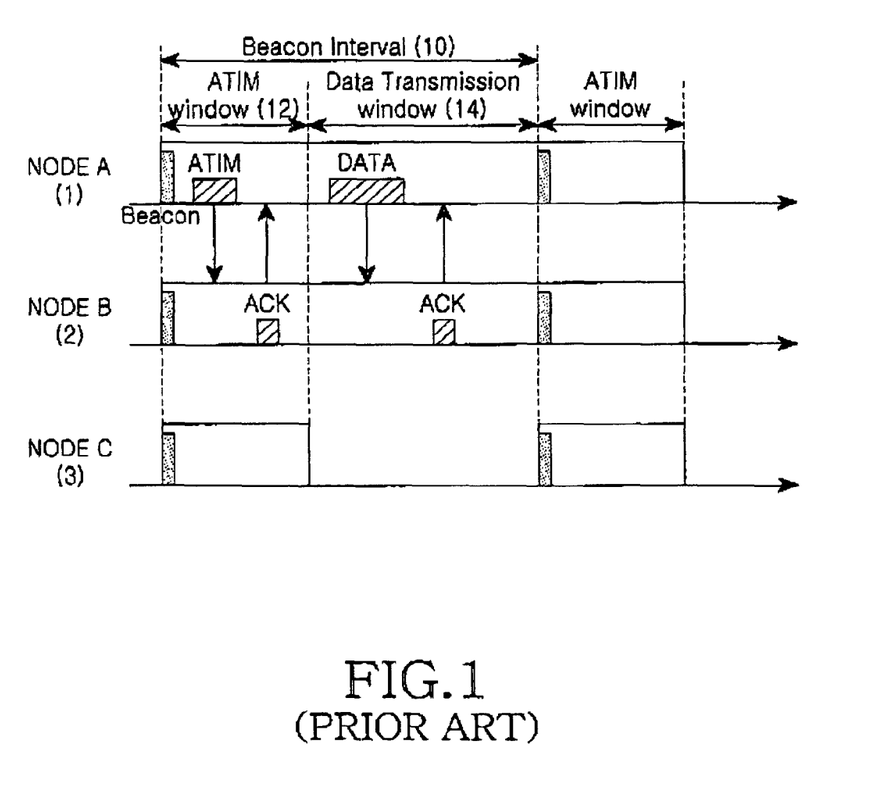
FIG. 1 is a view illustrating a conventional power save mode (PSM) mechanism in a mobile ad hoc network (MANET)

FIG. 1 is an explanatory view illustrating the PSM in the MANET. Referring to FIG. 1, each node reduces a power supply when not transmitting or receiving a packet, and wakes up periodically, that is, at each beacon interval (BI). Then, as the node sends information indicating when its own node will transmit a packet or recognizes when its own node will receive a packet, it participates in communication, thereby reducing power consumption.

As described above, the time in the DCF is divided into beacon intervals (BIs) 10. Each BI 10 is divided into an ad hoc traffic indication message (ATIM) window 12 and a following data transmission window 14. In the beginning of each BI, all nodes wake up, exchange beacon frames and synchronize with one another using time stamps in the beacon frames. After the exchange of the beacon frames, the announcements for next traffic are transmitted. Each node listens for these announcements and determines whether to stay awake. If a node does not have any traffic to be sent or received at the end of the ATIM window, the node transitions to the sleep state until the beginning of the next BI.

For example, a node-A (1) sends an ATIM to a node-B (2) during the ATIM window 12, notifying the node-B (2) that a packet to be sent is present. Thus, the node-B (2) receives the ATIM during the ATIM window 12 and sends an acknowledgement (ACK) message to the node-A (1). Then, the node-A (1) transmits the packet to the node-B (2) and the node-B (2) sends an ACK message to the node-A (1) upon receiving the packet.

All the nodes in the sleep state periodically stay awake for a predetermined time period at each BI. In the IEEE 802.11 standard, the predetermined time period is referred to as an ATIM window. During the ATIM window, the nodes exchange beacon frames and synchronize with one another. When an ATIM frame to be sent is present, each node sends the ATIM frame. A destination of the ATIM frame is determined by a destination of its message.

When a message to be sent is destined for a specific neighbor node, the destination of an ATIM frame is the same as the destination of the message. This ATIM frame is referred to as a unicast ATIM frame. A neighbor node receiving the unicast ATIM frame responds through an ACK frame to notify that the unicast ATIM frame has been appropriately received. At the end of the ATIM window, the neighbor node stays awake and receives a message.

However, when a message to be sent is destined for all the neighbor nodes, the destination of an ATIM frame is given to all the neighbor nodes. Accordingly, this frame is referred to as a broadcast ATIM frame. The neighbor nodes receiving the frame stay awake at the end of the ATIM window, and receive broadcast messages.

An ATIM frame can be sent only during the ATIM window, and the ATIM window repeatedly and periodically starts at a start point of a beacon interval (BI). If the ATIM window expires, a node sending the ATIM frame and a node receiving the ATIM frame transmit packets in the awake state during the rest of the BI. The other nodes, i.e., the nodes not sending or receiving an ATIM frame, go into the sleep state and save power.

In order for consumption power to be saved in a standby state, the BI must be set to be relatively longer than the ATIM window. However, when a corresponding node desires to transmit a message, the node must wait until the beginning of the next BI. As a result, the transmission delay time is longer.

More specifically, when a broadcast message is sent to the entire network in a multi-hop ad hoc network based on the pre-existing IEEE 802.11 DCF PSM, a long transmission delay time is required until the message reaches all the nodes because the message is transmitted one hop during each BI. In the case of a network protocol establishing a path to a destination depending upon a network broadcast as in an application program or an ad hoc on-demand distance vector (AODV) routing algorithm frequently employing a network broadcast message, its performance can be severely degraded according to the long transmission delay time. For example, assuming that the longest path in the network is 4 hops and a BI is set to 500 msec, a minimum time period of 2 sec is required for a message to reach a destination and an additional time period of 2 sec is required for a response message to be received. This operation will be described in more detail herein below with reference to FIGS. 2A and 2B.

Figure 2A:
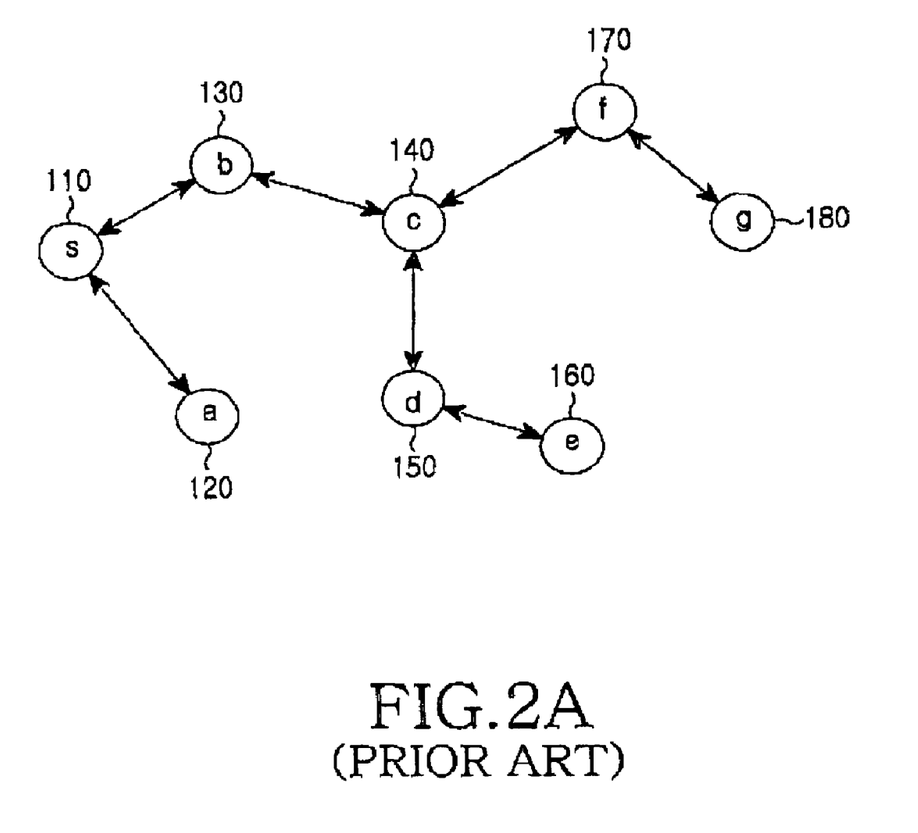
FIGS. 2A and 2B are views illustrating an example of transmitting a packet according to a conventional PSM mechanism.
Figure 2B:
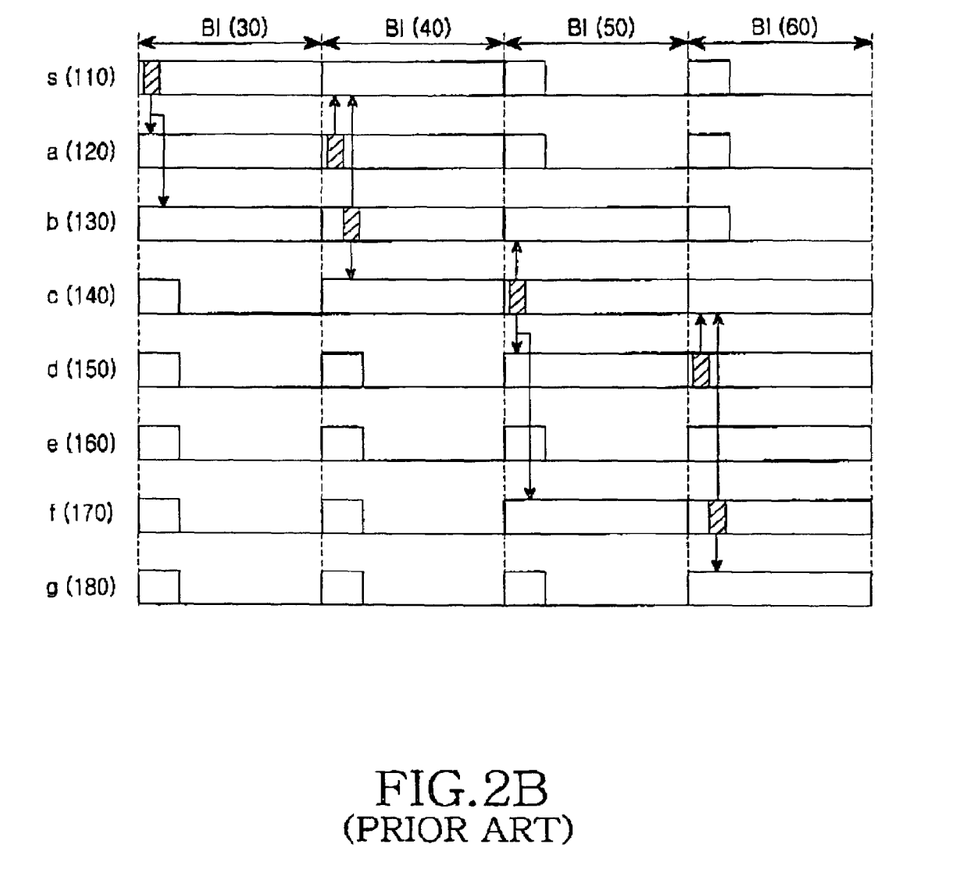

FIGS. 2A and 2B are views illustrating an example of transmitting a packet according to a conventional PSM mechanism. Referring to FIG. 2A, network including node-s 100 and node-a to node-g 120-180, the longest path from the source node-s 110 is 4 hops (from node s to node-e or g), and at least 4 beacon intervals are needed for the packets to reach all nodes. If there are collisions between the nodes, more than 4 beacon intervals may be needed. Referring to FIG. 2B, packet forwarding steps are illustrated when flooding originates at the node-s 110. The arrows illustrated in FIG. 2B indicate the transmission of ATIMs during each of the BIs 30-60. For simplicity, no ACK is returned and arrows for data packet transmissions are omitted. In the conventional PSM mechanism, the problem is not just the latency, but also an amount of power consumption. Further, the flooding is more problematic. Each node in experiencing flooding cannot determine whether the ATIM is duplicated before receiving an ATIM, so each node must stay awake even for the redundant messages.

Consequently, when the pre-existing IEEE 802.11 DCF PSM mechanism is employed in the multi-hop ad hoc network, an amount of consumption power is inversely proportional to a response delay time. The more consumption power is saved, the longer a response time is.

SUMMARY OF THE INVENTION

Therefore, the present invention has been designed in view of the above and other problems, and it is an object of the present invention to provide a method for transmitting a flooding ad hoc traffic indication message (FATIM) and a medium access control (MAC) protocol layer module therefor for reducing power consumption in a standby state and simultaneously transmitting a broadcast message to an entire network when a multi-hop ad hoc network based on a power save mode (PSM) is formed.

In accordance with an aspect of the present invention, the above and other objects can be accomplished by a method for transmitting a flooding ad hoc traffic indication message (FATIM) in a power save mode, in a mobile ad hoc network (MANET) including a plurality of nodes. The FATIM includes a beacon interval that is divided into an ad hoc traffic indication message (ATIM) window and a next data transmission window. The method comprises the steps of: when one of the plurality of nodes has data to be forwarded to different nodes, forwarding a FATIM frame indicating that a network broadcast message will be sent to its neighbor nodes during the ATIM window; and if a current ATIM window has not expired, allowing at least one different node of the plurality of nodes receiving the FATIM frame to forward the received FATIM frame to its neighbor nodes.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

In accordance with the present invention, when a network broadcast message is transmitted, a flooding ad hoc traffic indication message (FATIM) is transmitted and then propagated to neighbor nodes during the same ATIM window, such that the network broadcast message is sent to peripheral nodes of one or more hops during one beacon interval (BI).

Figure 3:
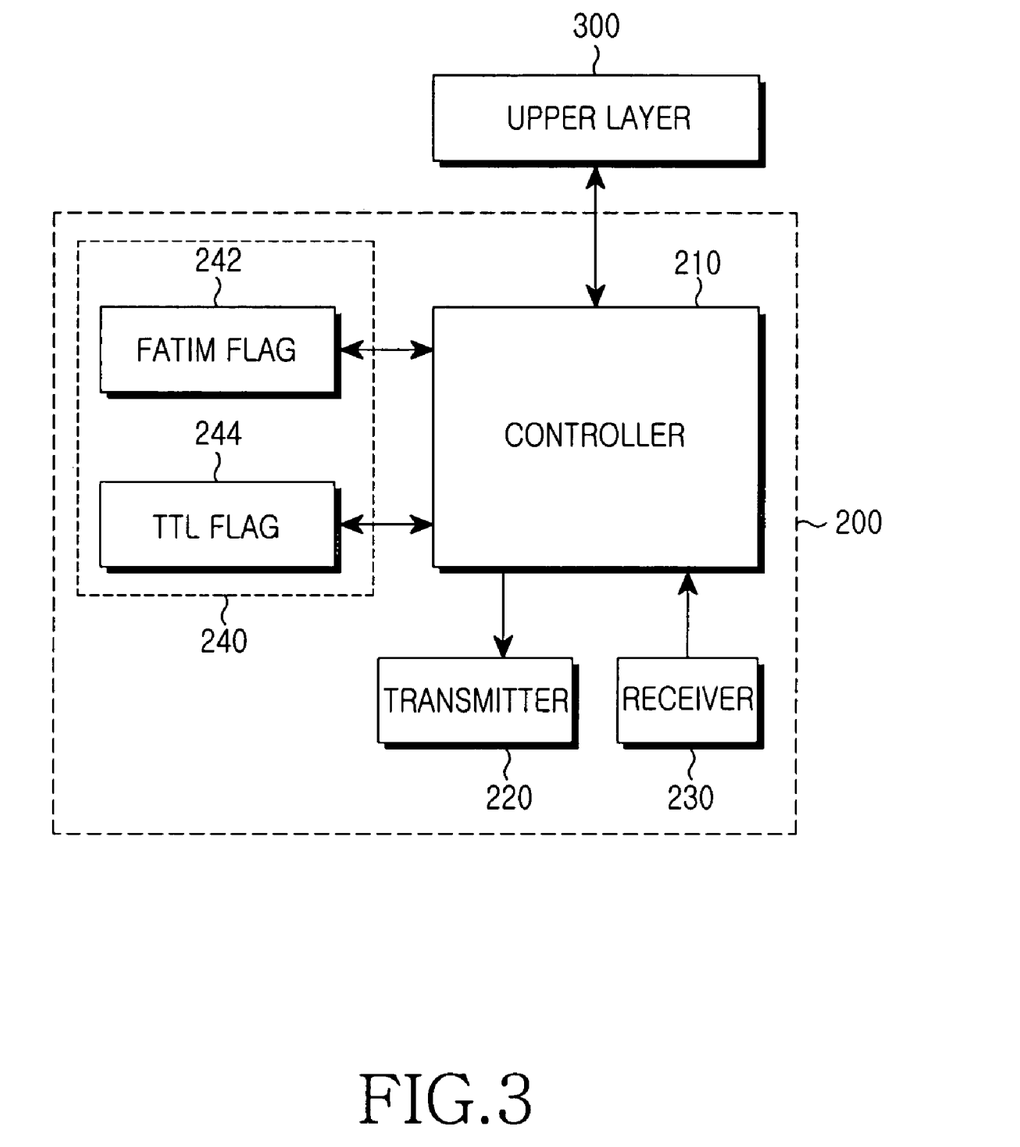
FIG. 3 is a block diagram illustrating the configuration of a medium access control (MAC) protocol layer module of a mobile terminal in a MANET in accordance with an embodiment of the present invention.

FIG. 3 is a block diagram illustrating the configuration of a medium access control (MAC) protocol layer module of a mobile terminal in a mobile ad hoc network (MANET) in accordance with one embodiment of the present invention. Referring to FIG. 3, a MAC protocol layer module 200 of the mobile terminal in accordance with the present invention includes a controller 210, a transmitter 220, a receiver 230, and a memory 240.

When the mobile terminal equipped with the MAC protocol layer module 200 generates a network broadcast message and transmits the generated network broadcast message to other nodes, the controller 210 receives, from an upper layer 300, a FATIM frame indicating that the network broadcast message will be sent to neighbor nodes during the next BI. Thus, the controller 210 sends the ATIM frame from the upper layer 300 through the transmitter 220 during the ATIM window. The transmitter 220 receives the FATIM frame from the controller 210 and transmits the received FATIM frame to the neighbor nodes. Then, when the ATIM window expires during the BI, the controller 210 transmits the network broadcast message received from the upper layer 300 to the neighbor nodes through the transmitter 220 during data transmission window.

When the controller 210 has received a FATIM frame from the upper layer 300 and transmitted the received FATIM frame through the transmitter 220, an FATIM flag 242 is set in the memory 240. Subsequently, although the controller 210 repeatedly receives a FATIM frame transmission request from the upper layer 300, it identifies the FATIM flag 242 and does not retransmit the FATIM frame according to a result of the identification.

Further, upon receiving a FATIM frame from a neighbor node, the controller 210 identifies the FATIM flag 242 and determines whether the FATIM frame has been sent during current ATIM window. If the FATIM frame has not been sent, the controller 210 forwards the FATIM frame to the neighbor nodes. After receiving the FATIM frame, the controller 210 determines whether the current ATIM window has expired FATIM. If the current ATIM window has not expired, the controller 210 forwards the FATIM frame to the neighbor nodes. Subsequently, the controller 210 sets the FATIM flag 242 of the memory 240 and then indicates that the FATIM frame has been transmitted.

Alternatively, a time-to-live (TTL) field is added to the FATIM frame so that a FATIM frame transmission interval can be limited in accordance with another embodiment of the present invention. The TTL field is located in a data field. A TTL value is a copy of a TTL value of an Internet protocol (IP) packet. The TTL field indicates an interval in which a FATIM frame must be transmitted, that is, a FATIM frame transmission range, in a unit of hops. In accordance with another embodiment of the present invention, a destination address (DA) field can be added to a data field of the FATIM frame so that the FATIM frame can be differentiated from the pre-existing ATIM frame. A value of the DA field contained in the data field indicates a common broadcast IP address or a specific multicast IP address assigned by an application. Adding the DA field and the TTL field to the data field is simpler than changing the definition or function of other fields.

Upon receiving a FATIM frame from the upper layer 300 in accordance with another embodiment of the present invention, the controller 210 determines whether the FATIM frame has already been transmitted, and confirms a TTL field value of a corresponding FATIM frame. At this point, the controller 210 confirms the FATIM flag 242 and a TTL flag 244 of the memory 240.

If the controller 210 has received the FATIM frame from the upper layer 300 and transmitted the received FATIM frame to the transmitter 220, a determination can be made as to whether the FATIM frame has been transmitted, through the FATIM flag 242 set in the memory 240. Subsequently, although the controller 210 repeatedly receives a FATIM frame transmission request from the upper layer 300, it identifies the FATIM flag 242 and does not retransmit the FATIM frame according to a result of the identification.

Upon receiving, a FATIM frame having a larger TTL value than a TTL value of a previously transmitted FATIM frame, from the upper layer 300, the controller 210 sends the received FATIM frame having the larger TTL value to the neighbor nodes. More specifically, the controller 210 recognizes the number of hops required for transmitting the FATIM frame according to a TTL field value of the FATIM frame received from the upper layer 300. Thus, the controller 210 receives a FATIM frame retransmission request from the upper layer 300. If a TTL field value of the FATIM frame received from the upper layer 300, that is, the number of hops required for transmitting the FATIM frame, is larger than a TTL field value of a previous FATIM frame indicated in the TTL flag 244, a corresponding FATIM frame is transmitted to the neighbor nodes. The number of hops at the time of transmitting the FATIM frame indicates how far the FATIM frame must be transmitted. The FATIM frame having a smaller TTL field value than a TTL field value of the previously transmitted FATIM frame does not need to be retransmitted. That is, upon receiving the FATIM frame and recognizing an awake state after corresponding ATIM window, the nodes do not need to receive the FATIM frame again.

However, the FATIM frame having a larger TTL field value than a TTL field value of the previously transmitted FATIM frame is forwarded farther than the previously transmitted FATIM frame. Accordingly, if the controller 210 receives, from the upper layer 300, the FATIM frame having the larger TTL field value than a TTL field value of the previously transmitted FATIM frame even though it has already transmitted, it transmits the received FATIM frame to the neighbor nodes.

Upon receiving a FATIM frame from a neighbor node in accordance with another embodiment of the present invention, the controller 210 identifies the FATIM flag 242 of the memory 240 and determines whether the FATIM frame has been transmitted during the current ATIM window. The FATIM frame having a smaller TTL field value than a TTL field value of the previously transmitted FATIM frame does not need to be retransmitted.

If a TTL field value of the FATIM frame is larger than a TTL field value of the previously transmitted FATIM frame, even though it has already transmitted, the controller 210 transmits the received FATIM frame to the neighbor nodes. After the FATIM frame is transmitted, the controller 210 updates the TTL flag 244 of the memory 240.

After the FATIM frame is received, the controller 210 determines whether the current ATIM window has expired FATIM. If the current ATIM window has not expired, the controller 210 transmits the FATIM frame to the neighbor nodes. Subsequently, the controller 210 sets the FATIM flag 242 of the memory 240 and indicates that the FATIM frame has been transmitted.

Upon forwarding the received FATIM frame to the neighbor nodes through the transmitter 220, the controller 210 decrements the TTL field value of a corresponding FATIM frame. That is, the TTL field value indicates the ATIM frame transmission range in a unit of hops. As one hop has been carried out when the ATIM frame is received and transmitted, the controller 210 decrements the TTL field value by 1. As a result, the decremented TTL field value of the FATIM frame can indicate a range in which a current ATIM frame must be transmitted.

The controller 210 waits to receive a network broadcast message while staying awake during the data transmission window subsequent to the current ATIM window. When the controller 210 has received the network broadcast message through the receiver 230, the received network broadcast message is forwarded to the neighbor nodes during the rest of a BI. If the controller 210 has received the FATIM frame from a neighbor node, but the rest of the current ATIM window is insufficient to transmit the FATIM frame to other neighbor nodes, the received FATIM frame cannot be appropriately forwarded to other neighbor nodes. In this case, the controller 210 temporarily stores the received FATIM frame, and forwards the stored FATIM frame to other neighbor nodes at the beginning of the next ATIM window.

Upon receiving the network broadcast message as the current ATIM window expires, before the FATIM frame is forwarded to other neighbor nodes, the controller 210 stores the received network broadcast message without forwarding it. After the FATIM frame is transferred to other neighbor nodes during the ATIM window of the next BI, the controller 210 forwards the stored network broadcast message to other neighbor nodes. If a destination of a data packet received during the data transmission window is the controller 210, the controller 210 appropriately processes the received data packet and transfers the processed data packet to the upper layer 300.

Conventionally, a node receiving the broadcast ATIM waits to receive a network broadcast message from a neighbor node in the awake state until a corresponding BI expires. However, in accordance with the present invention, a node receives a FATIM frame and forwards the received FATIM frame to another neighbor node during the same ATIM window, if possible, in order for the network broadcast message to be received from one neighbor node and forwarded to another neighbor node.

Figure 4:
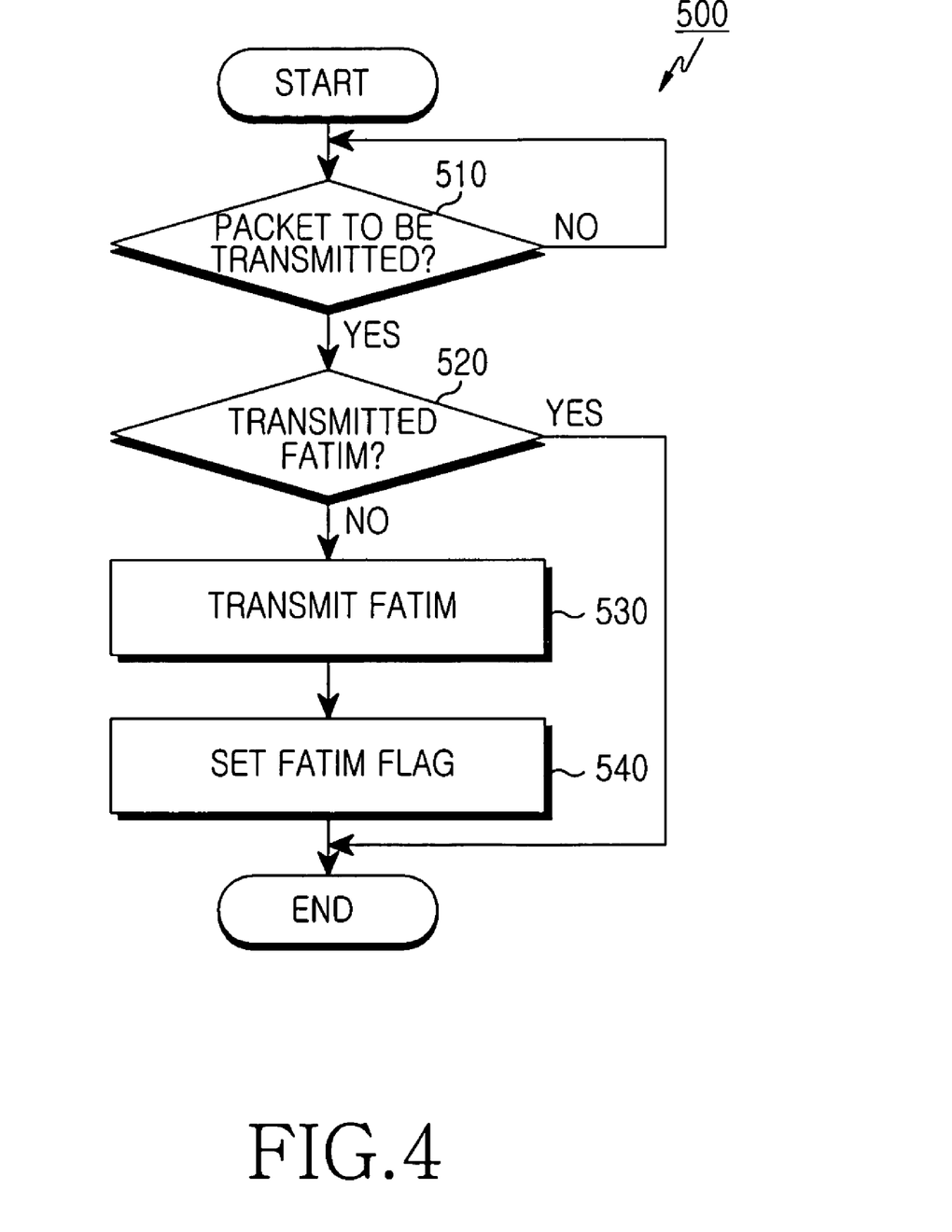
FIG. 4 is a control flow chart illustrating a method for transmitting a flooding ad hoc traffic indication message (FATIM) when the mobile terminal transmits a network broadcast message in accordance with an embodiment of the present invention.
Figure 5:
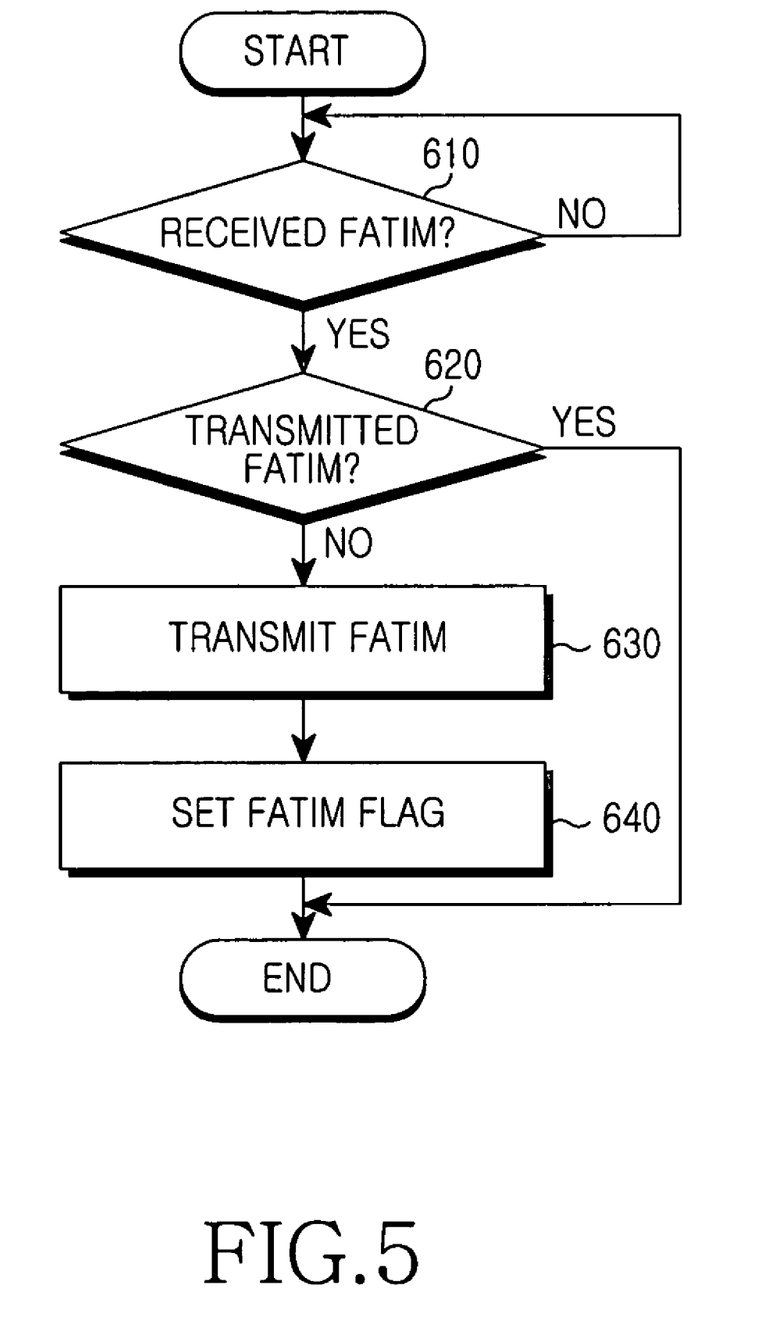
FIG. 5 illustrates a control flow chart when the mobile terminal receives the FATIM in accordance with an embodiment of the present invention.

FIG. 4 is a control flow chart illustrating a method for transmitting a FATIM when the mobile terminal transmits a network broadcast message in accordance with an embodiment of the present invention. FIG. 5 illustrates a control flow chart when the mobile terminal receives the FATIM in accordance with an embodiment of the present invention. A scheme for transmitting the FATIM in accordance with the present invention is referred to as a fast flooding scheme for the power save mode (FFPSM).

Referring to FIG. 4, at step 510, the controller 210 of the MAC protocol layer module provided in the mobile terminal in accordance with the present invention determines whether a data packet to be transmitted to another node is present, and proceeds to step 520 if the data packet to be transmitted is present. The controller 210 can determine the presence of the data packet to be transmitted by receiving a FATIM frame indicating that a network broadcast message will be sent from the upper layer 300 to neighbor nodes during the next BI.

At step 520, the controller 210 determines whether a FATIM frame has been transmitted. The controller 210 can determine whether the FATIM frame has been transmitted, by referring to the FATIM flag 242 of the memory 240. If the FATIM frame has not been transmitted, the controller 210 proceeds to step 530, and transmits, to neighbor nodes, the FATIM frame received from the upper layer 300, if the current ATIM window has not expired. Subsequently, the controller 210 proceeds to step 540, sets the FATIM flag 242 of the memory 240, and indicates that the FATIM frame has been transmitted.

Then, when the ATIM window expires in a beacon interval (BI), the controller 210 transmits a network broadcast message from the upper layer 300 to the neighbor nodes through the transmitter 220 during the data transmission window.

FIG. 5 illustrates the case where the mobile terminal receives the FATIM. Referring to FIG. 5, at step 610, the controller 210 determines whether a FATIM frame has been received from a neighbor node. If the controller 210 has received the FATIM frame, it proceeds to step 620, where the controller 210 refers to the FATIM flag 242 of the memory 240, and determines whether the FATIM frame has been transmitted. If the FATIM frame has not been transmitted, the controller 210 proceeds to step 630, and transmits the FATIM frame received from the upper layer 300 to the neighbor nodes, if the current ATIM window has not expired. Subsequently, the controller 210 proceeds to step 640, sets the FATIM flag 242 of the memory 240 and indicates that the FATIM frame has been transmitted.

Figure 6:
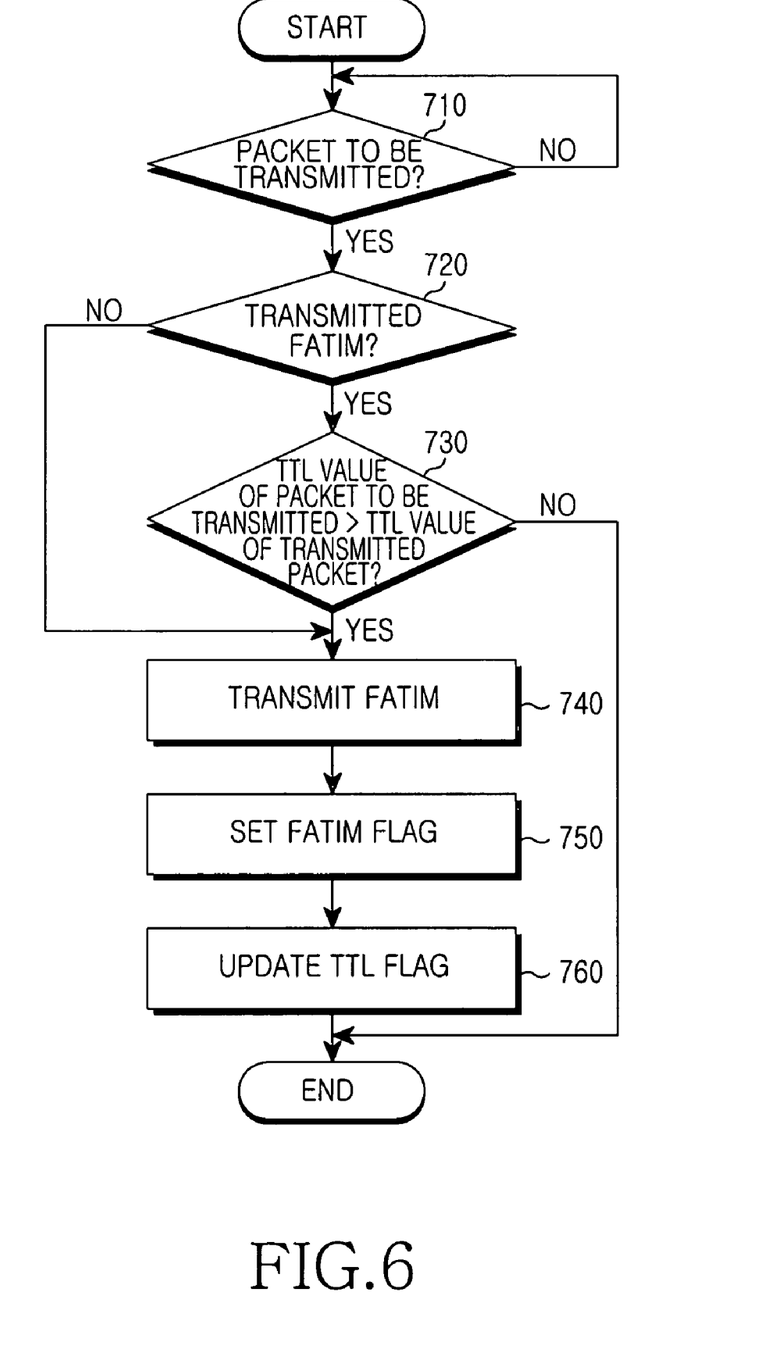
FIG. 6 is a control flow chart illustrating a method for transmitting the FATIM when the mobile terminal transmits a network broadcast message in accordance with an embodiment of the present invention.
Figure 7:
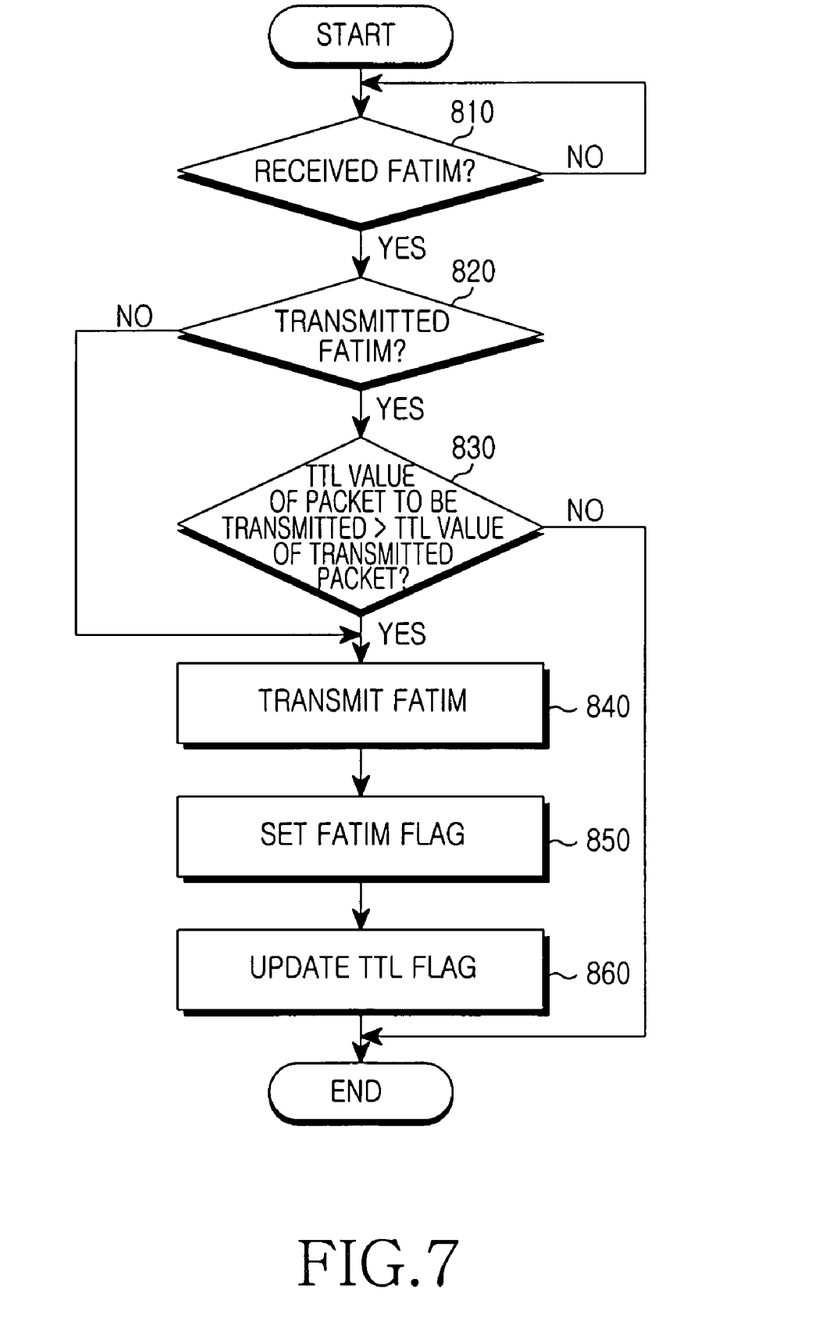
FIG. 7 illustrates a control flow chart when the mobile terminal receives the FATIM in accordance with an embodiment of the present invention.

FIG. 6 is a control flow chart illustrating a method for transmitting the FATIM when the mobile terminal transmits a network broadcast message in accordance with an embodiment of the present invention. FIG. 7 illustrates a control flow chart when the mobile terminal receives the FATIM in accordance with an embodiment of the present invention.

Referring to FIG. 6, at step 710, the controller 210 of the MAC protocol layer module provided in the mobile terminal determines whether a data packet to be transmitted to another node is present, and proceeds to step 720 if the data packet to be transmitted is present. The controller 210 can determine the presence of the data packet to be transmitted by receiving a FATIM frame indicating that a network broadcast message will be sent from the upper layer 300 to neighbor nodes during the next BI.

Subsequently, at the above step 720, the controller 210 determines whether the FATIM frame has been transmitted. The controller 210 can determine whether the FATIM frame has been transmitted, by referring to the FATIM flag 242 of the memory 240. If the FATIM frame has been transmitted, the controller 210 determines whether a TTL field value of the FATIM frame received from the upper layer 300 is larger than a TTL field value of a previously transmitted FATIM frame. The number of hops at the time of transmitting the FATIM frame indicates how far the FATIM frame must be transmitted. The FATIM frame having a smaller TTL field value than a TTL field value of the previously transmitted FATIM frame does not need to be retransmitted. That is, upon receiving the FATIM frame and recognizing an awake state at the end of a corresponding ATIM window, the nodes do not need to receive the FATIM frame again. However, the FATIM frame having a larger TTL field value than a TTL field value of the previously transmitted FATIM frame is forwarded farther than the previously transmitted FATIM frame. Accordingly, if the controller 210 receives, from the upper layer 300, the FATIM frame having the larger TTL field value than a TTL field value of the previously transmitted FATIM frame even though it has been already transmitted, the controller 210 transmits the received FATIM frame to the neighbor nodes if the current ATIM window has not expired at step 740. The TTL field value indicates an ATIM frame transmission range in a unit of hops. As one hop has been carried out when the ATIM frame is received and transmitted, the controller 210 decrements the TTL field value by 1. Therefore, the decremented TTL field value of the FATIM frame can indicate a range in which a current ATIM frame must be transmitted.

If the FATIM frame has not been transmitted, the controller 210 proceeds to step 740, and transmits, to neighbor nodes, the FATIM frame received from the upper layer 300. Subsequently, at step 750, the controller 210 sets the FATIM flag 242 of the memory 240, and indicates that the FATIM frame has been transmitted. Then, the controller 210 updates a TTL flag value to a TTL field value of the currently transmitted FATIM frame at step 760.

Figure 8:
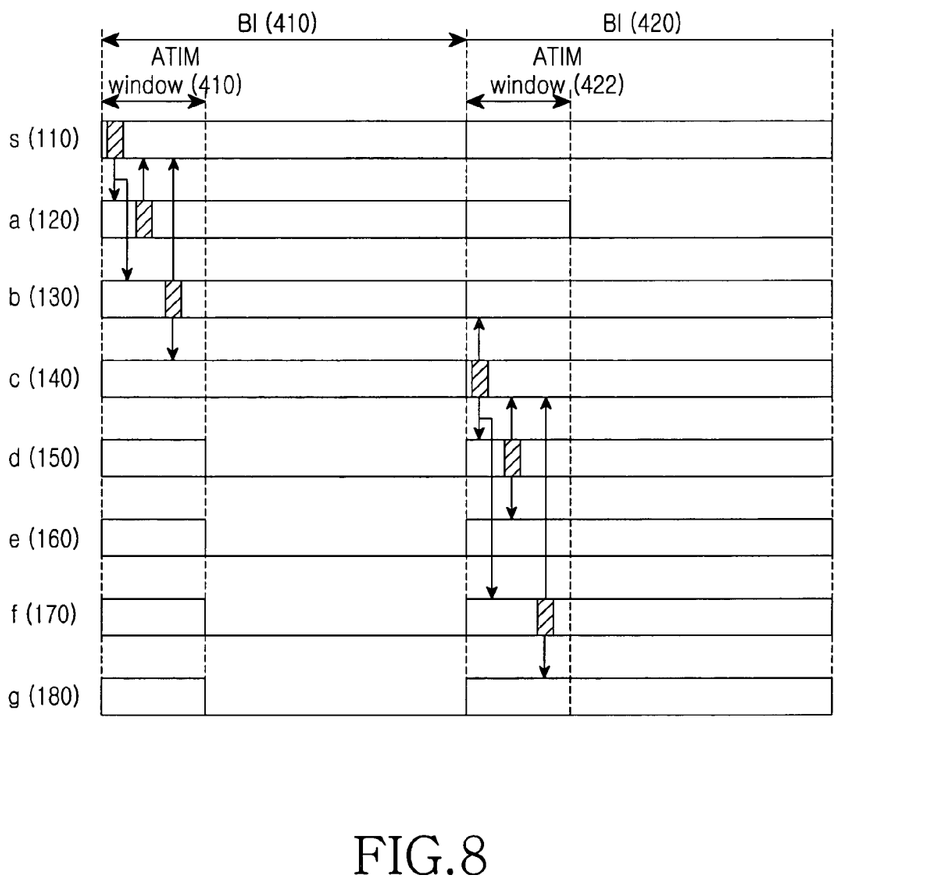
FIG. 8 is a view illustrating power states of respective nodes in accordance with an embodiment of the present invention.

FIG. 8 illustrates the case where the mobile terminal receives a flooding ad hoc traffic indication message (FATIM). At step 810, the controller 210 determines whether a FATIM frame has been received from a neighbor node. If the controller 210 has received the FATIM frame, it proceeds to step 820, where the controller 210 refers to the FATIM flag 242 of the memory 240, and determines whether the FATIM frame has been transmitted. If the FATIM frame has not been transmitted, the controller 210 proceeds to step 840 and transmits the FATIM frame received from the upper layer 300 to the neighbor nodes, if the current ATIM window has not expired.

However, if the FATIM frame has been transmitted, the controller 210 determines, at step 830, whether a TTL field value of the FATIM frame received from the upper layer 300 is larger than a TTL field value of a previously transmitted FATIM frame. If the controller 210 receives, from the upper layer 300, the FATIM frame having the larger TTL field value than a TTL field value of the previously transmitted FATIM frame even though it has already been transmitted, the controller 210 transmits the received FATIM frame to the neighbor nodes, if the current ATIM window has not expired at step 840. At this time, the controller 210 decrements the TTL field value of the FATIM frame by 1. Therefore, the decremented TTL field value of the FATIM frame can indicate a range in which a current ATIM frame must be transmitted.

Subsequently, at step 850, the controller 210 sets the FATIM flag 242 of the memory 240 and indicates that the FATIM frame has been transmitted. The controller 210 updates a TTL flag value to a TTL field value of the currently transmitted FATIM frame at step 860.

When the ATIM window expires in a beacon interval (BI), the controller 210 transmits a network broadcast message from the upper layer 300 to the neighbor nodes through the transmitter 220 during the data transmission window.

Thereafter, the controller 210 waits to receive a network broadcast message while maintaining the awake state during the data transmission window subsequent to the current ATIM window. When the controller 210 has received the network broadcast message through the receiver 230, the received network broadcast message is forwarded to the neighbor nodes during the rest of a BI. If the controller 210 has received the FATIM frame from a neighbor node, but the rest of the current ATIM window is insufficient to transmit other neighbor nodes, the received FATIM frame cannot be appropriately forwarded to other neighbor nodes. In this case, the controller 210 temporarily stores the received FATIM frame, and forwards the stored FATIM frame to other neighbor nodes in the beginning of the next ATIM window.

Further, the controller 210 waits for the next BI when the current ATIM window expires before the received flooding frame is forwarded to another neighbor node. If the controller 210 has received the network broadcast message during the data transmission window subsequent to the current ATIM window of the current BI, it stores the received network broadcast message. The controller 210 transmits the FATIM to the neighbor nodes during the ATIM window in the beginning of the next BI. The operation for transmitting and receiving the FATIM frame in the above-described fast flooding scheme for the power save mode (FFPSM) will be described herein below with reference to FIG. 8.

FIG. 8 is a view illustrating power states of respective nodes in accordance with an embodiment of the present invention. In FIG. 8, it is assumed that the respective nodes are connected as illustrated in FIG. 2A.

Referring to FIGS. 2A and 8, a source node 110 transmits a FATIM frame to a node-a 120 and a node-b 130 during ATIM window 412 of a first BI 410. Moreover, the source node 110 maintains an awake state and transmits a stored data packet, after the ATIM window 412.

The nodes 120 and 130, after receiving the FATIM frame, forward the FATIM frame during the rest of the current ATIM window. In FIG. 8, the node-a 120 forwards the FATIM frame to the source node-s 110 neighboring to the node-a 120 as in FIG. 2A, and the node-b 130 forwards the FATIM frame to the source node-s 110 and the node-c 140. At this point, the nodes 120 and 130, after receiving the FATIM frame, forward the FATIM frame during the rest of the ATIM window even though no buffered packet is present. These nodes maintain the awake state during the rest of the BI. If these nodes receive a message packet announced by the FATIM, the received message packet is forwarded to neighbor nodes during the rest of a corresponding BI. If the nodes 120 and 130 receiving the FATIM frame cannot transmit the FATIM frame during the current ATIM window, the FATIM is not forwarded although the message packet announced by the FATIM has been received before the next BI begins.

The node-c 140 receiving the FATIM frame from the node-b 130 determines that the rest of the current ATIM window is insufficient to forward the FATIM frame to other neighbor nodes and waits until the ATIM window of the next BI. Subsequently, the node-c 140 forwards the FATIM frame to neighbor nodes 130, 150, and 170 during the ATIM window 422 of the next BI 420.

The node-d 150, after receiving the FATIM frame from the node-c 140, forwards the FATIM frame to the neighbor node-c 140 and node-e 160 during the ATIM window 422 of the BI 420. Moreover, the node-f 170 forwards the FATIM frame to the neighbor node-c 140 and node-g 180.

Conventionally, a node receiving the broadcast ATIM waits to receive a network broadcast message from a neighbor node in the awake state until a corresponding BI expires. However, in accordance with the present invention, a node receives a FATIM frame and forwards the received FATIM frame to another neighbor node during the same ATIM window, if possible, so that the network broadcast message is received from one neighbor node and forwarded to another neighbor node.

As described above, the present invention effectively reduces transmission delay of a network broadcast message in a multi-hop ad hoc network using a power save mode (PSM), thereby preventing the performance degradation of a program and protocol and maintaining the effect of energy saving. In accordance with the present invention, as many nodes are awake whenever a network broadcast message is transmitted, recovery is quickly carried out, and a cut-off phenomenon in the course of conversation can be prevented even though a route established in the ad hoc network is broken.

Although preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments and drawings.

What is claimed is:

1. A method for transmitting a flooding ad hoc traffic indication message (FATIM) in a power save mode having a beacon interval that is divided into an ad hoc traffic indication message (ATIM) window and a next data transmission window, in a mobile ad hoc network (MANET) including a plurality of nodes, comprising the steps of:

when a first node of the plurality of nodes has data to be forwarded to different nodes, forwarding, by the first node, a FATIM frame indicating that a network broadcast message will be sent to other nodes neighboring the first node during the ATIM window; and determining whether a current ATIM window has expired by a second node, and if the ATIM window has not expired, forwarding, by the second node, the received FATIM frame from the first node to other nodes neighboring the second node for indicating that a network broadcast message will be sent to the other nodes neighboring the second node.

2. The method as set forth in claim 1, wherein the nodes receiving the FATIM frame stay awake during the next data transmission window from which the FATIM frame is received.

3. The method as set forth in claim 1, wherein the FATIM frame comprises a time-to-live (TTL) field including a value representing an ATIM frame transmission range in a unit of hops.

4. The method as set forth in claim 3, further comprising the step of:
changing the TTL field value of the FATIM frame before the at least one different node of the plurality of nodes receiving the FATIM frame forwards the received FATIM frame to its neighbor nodes.

5. The method as set forth in claim 1, further comprising the step of:
if the current ATIM window expires, forwarding the received FATIM frame from the at least one different node of the plurality of nodes receiving the FATIM frame to its neighbor nodes during a next ATIM window.

6. A system for transmitting a flooding ad hoc traffic indication message (FATIM) in a power save mode having a beacon interval that is divided into an ad hoc traffic indication message (ATIM) window and a next data transmission window, in a mobile ad hoc network (MANET) including a plurality of nodes, comprising:
a first node for forwarding a FATIM frame indicating that a network broadcast message will be sent to other nodes neighboring the first node during the ATIM window when data to be forwarded to the plurality of nodes is present,
a second node for determining whether a current ATIM window has expired when the FATIM frame is received from at least one of the neighbor nodes, and if the ATIM window has not expired, forwarding the received FATIM frame to other nodes neighboring the second node.

7. The MAC protocol layer module as set forth in claim 6, wherein the plurality of nodes receiving the FATIM frame stay awake during the next data transmission window from which the FATIM frame is received.

8. The MAC protocol layer module as set forth in claim 6, wherein the FATIM frame comprises a time-to-live (TTL) field including a value representing an ATIM frame transmission range in a unit of hops.

9. The MAC protocol layer module as set forth in claim 8, wherein the controller changes the TTL field value of the FATIM frame before at least one different node of the plurality of nodes receiving the FATIM frame forwards the received FATIM frame to its neighbor nodes.

10. The MAC protocol layer module as set forth in claim 6, wherein the controller forwards the received FATIM frame to its neighbor nodes during a next ATIM window, if the ATIM window has expired, when receiving the FATIM frame.

* * * * *